(12) United States Patent
Nielsen

(10) Patent No.: US 6,212,268 B1
(45) Date of Patent: *Apr. 3, 2001

(54) PRE-SCHEDULED CALLBACK SERVICE

(75) Inventor: Jakob Nielsen, Atherton, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,873

(22) Filed: Nov. 26, 1997

(51) Int. Cl.[7] .................................... H04M 3/42
(52) U.S. Cl. ............................. 379/209; 370/352
(58) Field of Search .................... 379/209, 202, 379/204, 205, 265, 93.24, 90.01, 88.11; 370/352, 356

(56) References Cited

U.S. PATENT DOCUMENTS

| | | | |
|---|---|---|---|
| 5,619,555 | * 4/1997 | Fenton et al. | 379/88.11 |
| 5,661,790 | * 8/1997 | Hsu | 379/209 |
| 5,742,674 | * 4/1998 | Jain et al. | 379/209 |
| 5,835,568 | * 11/1998 | Bass et al. | 379/209 |
| 5,884,032 | * 3/1999 | Bateman et al. | 379/209 |
| 5,909,487 | * 6/1999 | Mainker | 379/209 |

* cited by examiner

Primary Examiner—Krista Zele
Assistant Examiner—Benny Q. Tieu
(74) Attorney, Agent, or Firm—McDermott, Will & Emery

(57) ABSTRACT

Techniques for establishing a pre-scheduled international telephone call using a callback service to take advantage of the arbitrage which exists when there is a rate difference between calls originating in the source and destination countries. In one approach the customer sends the call information to the callback service by completing an Internet based form. The callback service automatically places calls as pre-scheduled dates and times arrive. In one implementation, the callback service automatically sends reminder E-mail messages to call participants at some pre-determined time before the call is to occur. Another extension would allow call participants to respond to the reminder E-mail with information permitting their call to be forwarded or cancelled.

17 Claims, 8 Drawing Sheets

PRE-SCHEDULED CALLBACK SERVICE

BACKGROUND OF THE INVENTION

1. Field of the Invention

The invention relates to computer and communication systems and, more particularly, to telephone callback services arranged over a data network, such as the Internet.

2. Description of Related Art

The cost of an international telephone call between two countries can differ based on where the call originated. Callback services take advantage of this price difference by allowing a customer to place an international telephone call by arranging to have it originate in the country which has the most favorable tariffs. For example, a telephone call originating in Argentina and calling a phone number in the United States will typically cost more than the same telephone connection originating in the United States. Therefore, an Argentine customer may use a callback service that allows the call from Argentina to originate in the United States. The Argentine customer will place a call to a callback system's phone number in the United States. The customer hangs up the phone on the first ring, thus normally incurring no charge. The callback system places a call to the customers number and provides the customer with a dial tone such as one which allows a customer access to a United States long distance carrier.

The Problems

Currently, callback services experience at least three problems. The first problem is that the public telephone company in the customer's country may try to block access to the callback service. Some countries have attempted to block access to certain phone numbers associated with callback services. In some areas this approach has even extended to the blocking of entire area codes and local office prefixes. Another approach attempts to block the touch-tone signals required for the callback service.

A second problem is that the user interface provided by the callback service is not user friendly. A typical callback service typically requires the user to enter a long stream of digits into the phone keypad.

The third problem is that in some countries the customer may be charged for the initial call to the callback service.

SUMMARY OF THE INVENTION

The invention provides methods, apparatus, systems, and computer program products which overcome the problems of the prior art and allow a user to setup a pre-planned calling schedule with a callback service. The user provides callback information, such as the time of the call, the telephone numbers of the parties involved and the frequency with which a pre-scheduled call should be placed, via a data network, such as the Internet or through other means such as mail or fax if data network access is not available.

The callback service's computer server maintains the user's data and continuously checks to determine when a call should be placed. The server may store E-mail addresses for each of the parties who have E-mail access and who are involved in the call. At a predetermined time before the call is to be placed the server will send an E-mail to each party reminding them about the impending call. At a time stored in the database, the server will attempt to place the call. If the call is placed and the connection is made then the user is billed for the call using standard billing mechanisms. If the connection cannot be made, then the server will attempt to place the call again after a specified period of time.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
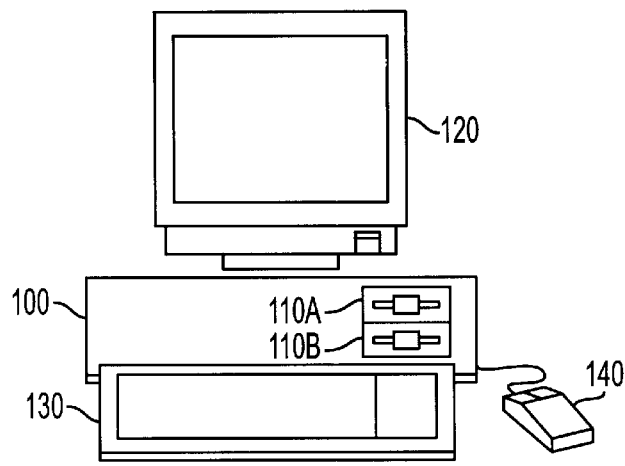
FIG. 1A is a view of an exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
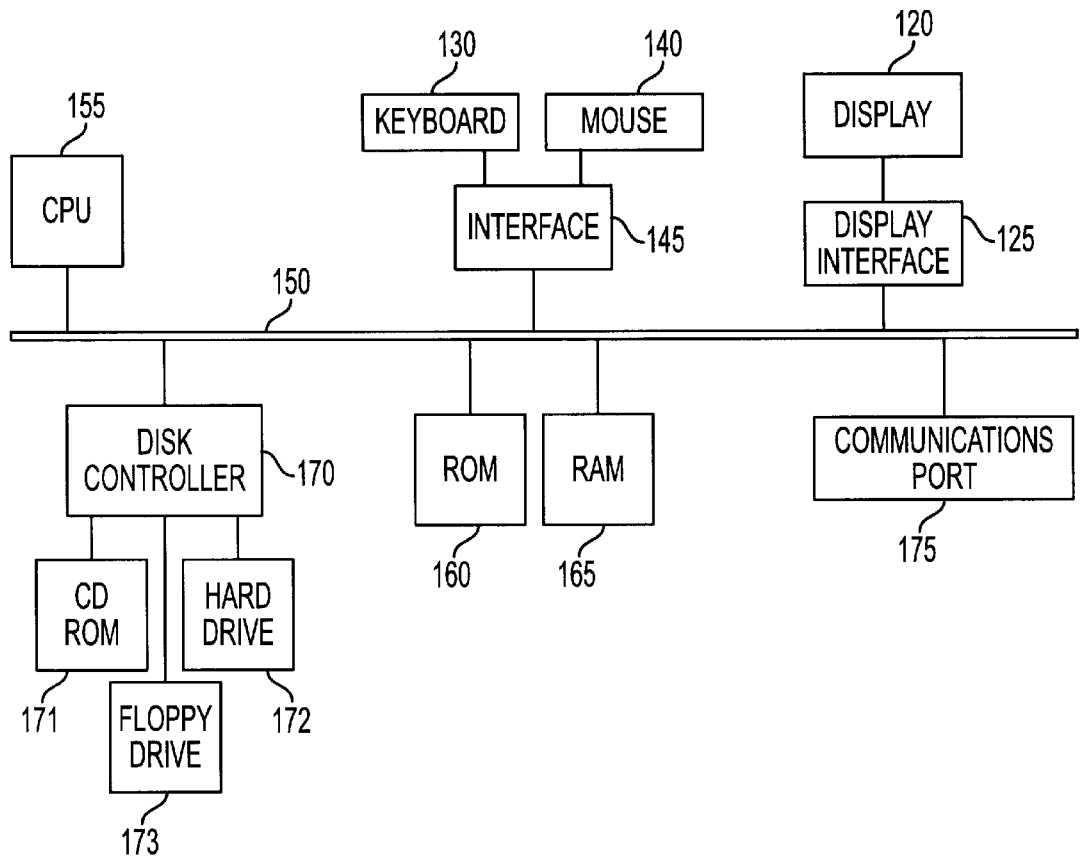
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
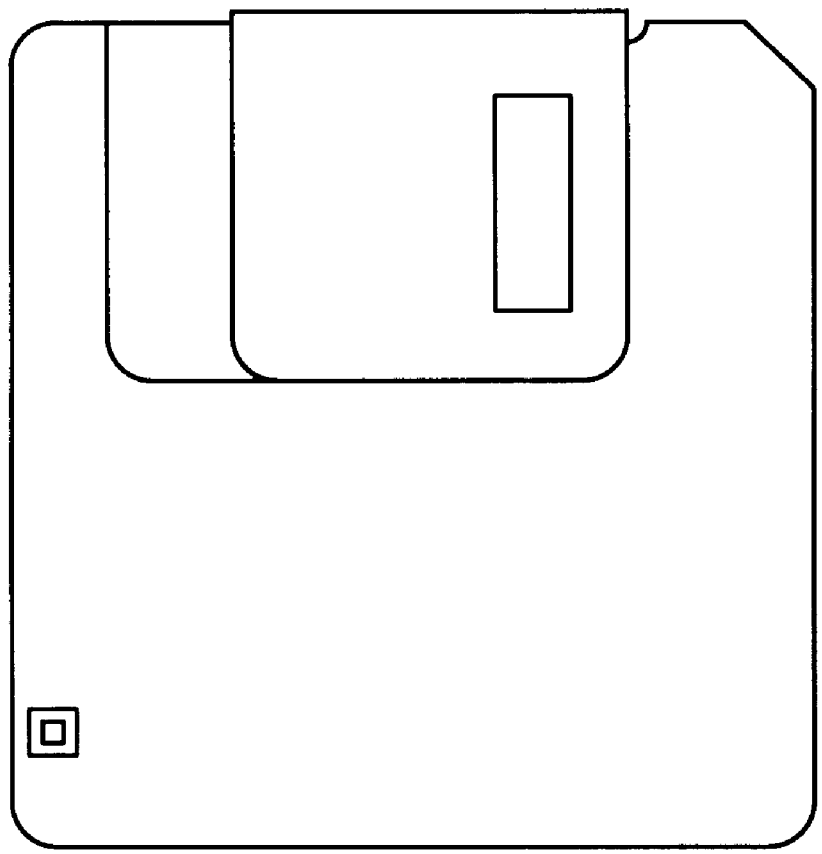
FIG. 1C is an illustration of an exemplary memory medium suitable for storing program and data information in accordance with the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 1D:
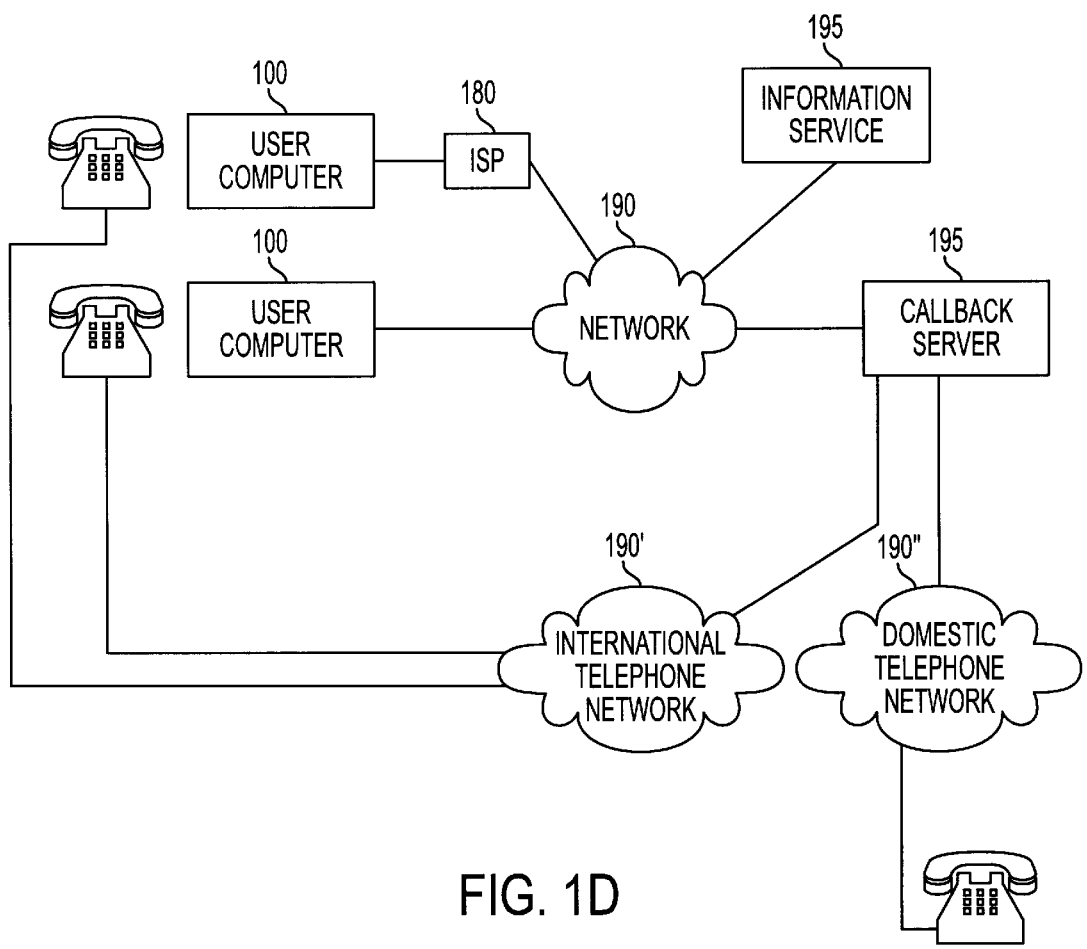
FIG. 1D is a block diagram of a network architecture suitable for carrying data and telephone calls in accordance with some aspects of the invention.

FIG. 1D is a block diagram of a network architecture suitable for carrying data and programs in accordance with some aspects of this invention. A network 190 serves to connect a user computer 100 with one or more servers, such as a callback server 195 for the transfer of program and data information. A user 100' can also connect to the network via a network service provider, such as an ISP 180. Users are also connected to international or domestic telephone networks, 190' and/or 190". In practice, the networks 190, 190' and 190" may be a single integrated voice and data network.

Figure 2:
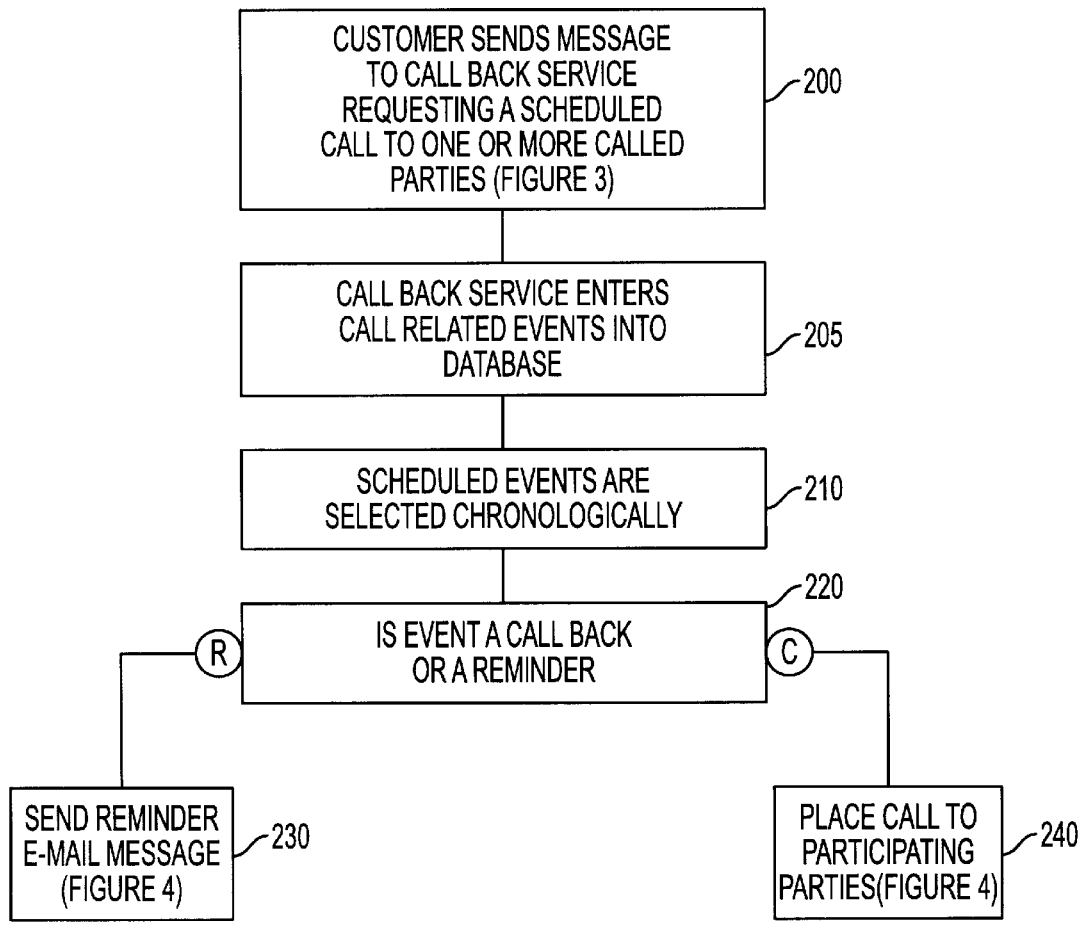
FIG. 2 is a flow chart of an exemplary pre-scheduled callback process in accordance with one embodiment of the invention.

FIG. 2 is a flow chart of an exemplary pre-scheduled callback process in accordance with one embodiment of the invention. A user establishes a pre-scheduled callback by providing certain information to the callback service (200). The information provided should include, but is not limited to: customer's phone number, customer's billing information (i.e., credit card number), the phone number(s) to connect with, the time the call should be placed, the interval between calls (i.e., every week, every month), the amount of time to wait before trying again if a call cannot be completed, and the number of times to attempt the call. In addition, the callback service may store E-mail addresses for call participants in order to send them reminder messages. Based on the information provided, the call back service schedules call related events such as the generation of reminder messages and the placing of a call to call participants into a database (205) with a date and time they should occur.

The preferred embodiment for entering callback information into the callback database is via an Internet based form. An exemplary process for handling Internet based forms is described in conjunction with FIG. 3. Alternative embodiments for obtaining call back information include, but are not limited to, paper based forms that are faxed or mailed to the callback service and touch-tone telephone menus.

The callback service server continuously checks the database to determine which calls need to be made and which reminder messages need to be sent (210). It accomplishes this by sorting events (reminders and calls) in chronological order and then checking the database entries against the current system time.

Based on the database entry the server determines if the event is a call or a reminder 220. If the event is a reminder the server will generate a reminder E-mail message and send it to the appropriate recipients 230. An exemplary E-mail reminder process is described in conjunction with FIG. 4. If the event to be processed is a call, the server will attempt to place the call 240. An exemplary callback connection process is described in conjunction with FIG. 5.

Figure 3:
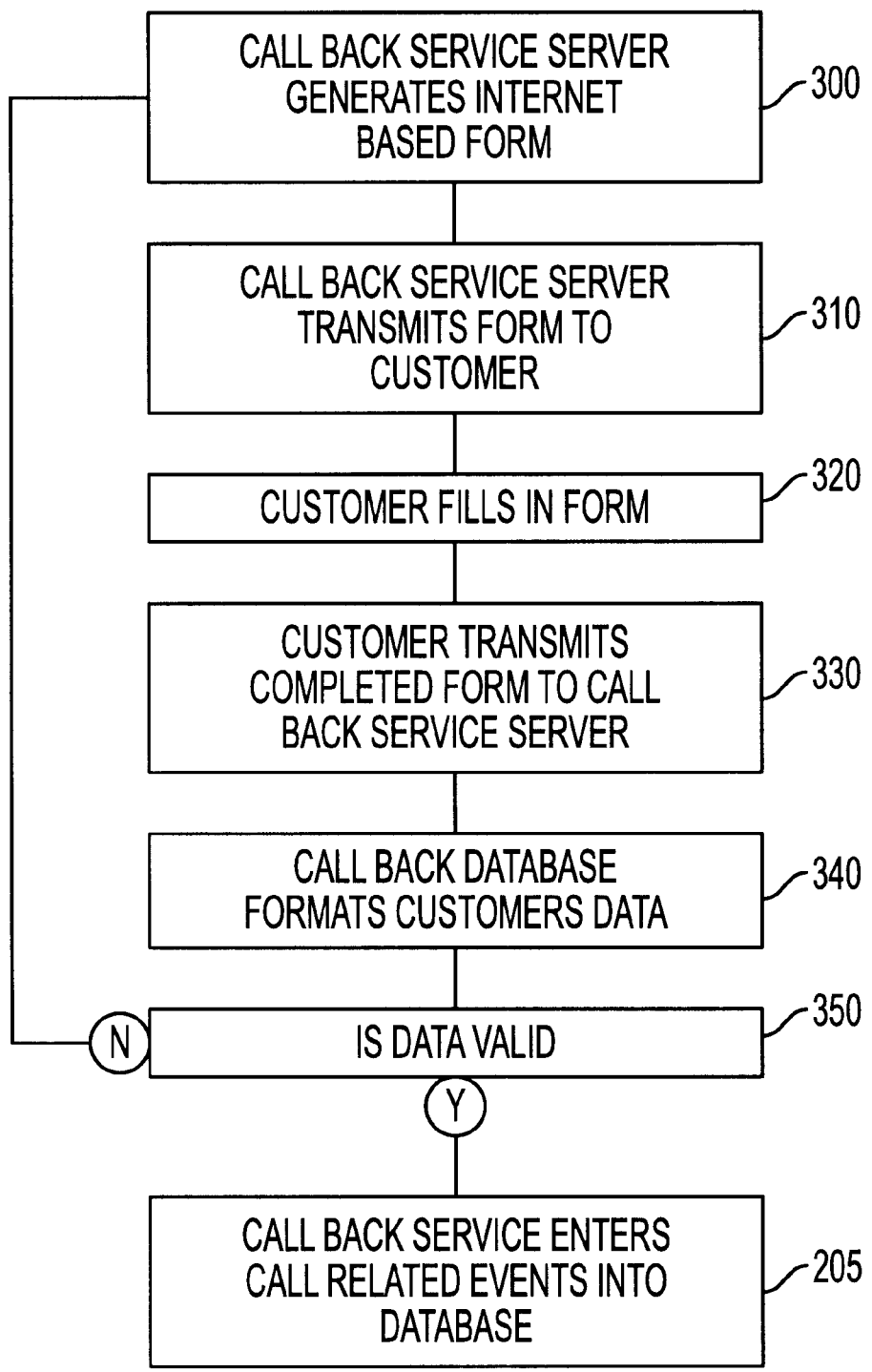
FIG. 3 is a flow chart of an exemplary process for handling a world wide web based form in accordance with one embodiment of the invention.

FIG. 3 is a flow chart of a preferred exemplary process for pre-scheduling a call using an Internet based form. This form can be generated using standard HTML or by a Java servelet 300. The form is then transmitted to the user by using standard Internet protocols 310. The user then fills in the data required 320 and transmits the completed form back to the server 330. The server will reformat applicable data elements to conform with the database standards 340. For example, different countries handle dates in different formats. This can cause problems for many database systems. Therefore, before a date is entered into the database, it is preferably converted into a standard format. The form data is then validated to ensure that all required data has been provided 350. Validation is required in order to ensure the customer has entered data in all required fields (i.e., phone number to call, date and time of call, and billing information) and to ensure that the data is within acceptable ranges. For example, dates and times need to be validated to ensure that they have not already passed. In addition, customer billing information should be verified during the data validation process. Data validation can take place on the server side using a CGI or Java program or on the client side using a Java applet. If the data cannot be validated then the server will generate a new form with the user's data filled in and a message describing the problem 300. Once the data has been formatted the events appropriate to the type of request are scheduled (e.g. E-mail reminders) and entered into the database 360.

Rather than use a form, a user could remotely log on to the callback server and issue commands by which it would schedule or set up the call.

Figure 4:
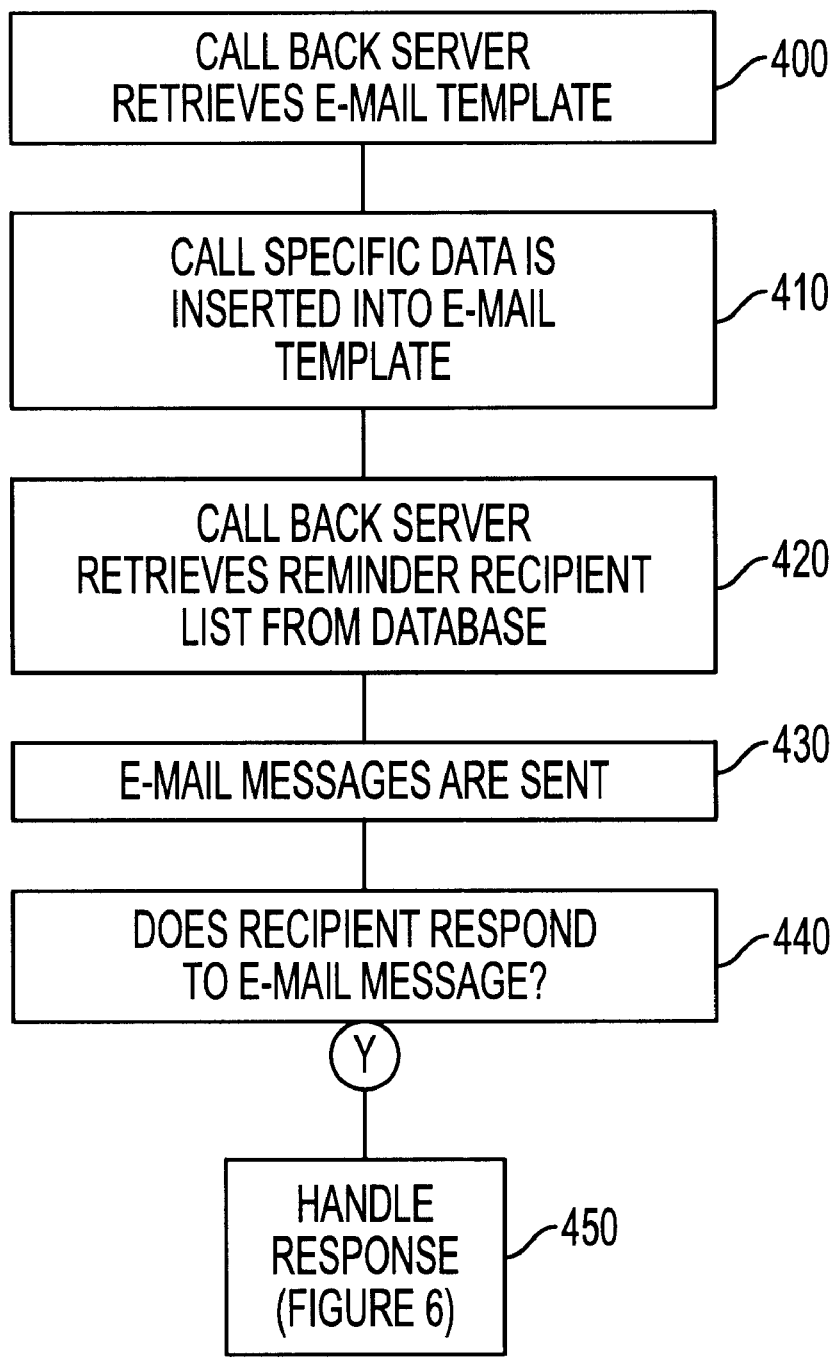
FIG. 4 is a flow chart of an exemplary E-mail reminder process in accordance with one embodiment of the invention.

FIG. 4 is a flow chart of an exemplary E-mail reminder process. When the server determines that a scheduled event is a reminder (see FIG. 2) it retrieves a preset E-mail template 400. The server then merges specific data about the impending call with the template 410. This procedure is similar to the mail merge feature provided with many well-known office suite software packages. The server then retrieves from the database the E-mail addresses of the people who are to receive the reminder 420. The E-mail reminder message is then sent to each person 430. E-mail recipients have the option of responding to the E-mail message 440. Recipients may want to indicate that they will be unavailable during the call time or they will be at a different phone number. If no recipients respond to the reminder, then the call can take place as scheduled 460. An exemplary callback connection process is described in conjunction with FIG. 5. If a recipient responds to the reminder message then the server will handle the response 450. An exemplary response handling process is described in conjunction with FIG. 6.

Figure 5:
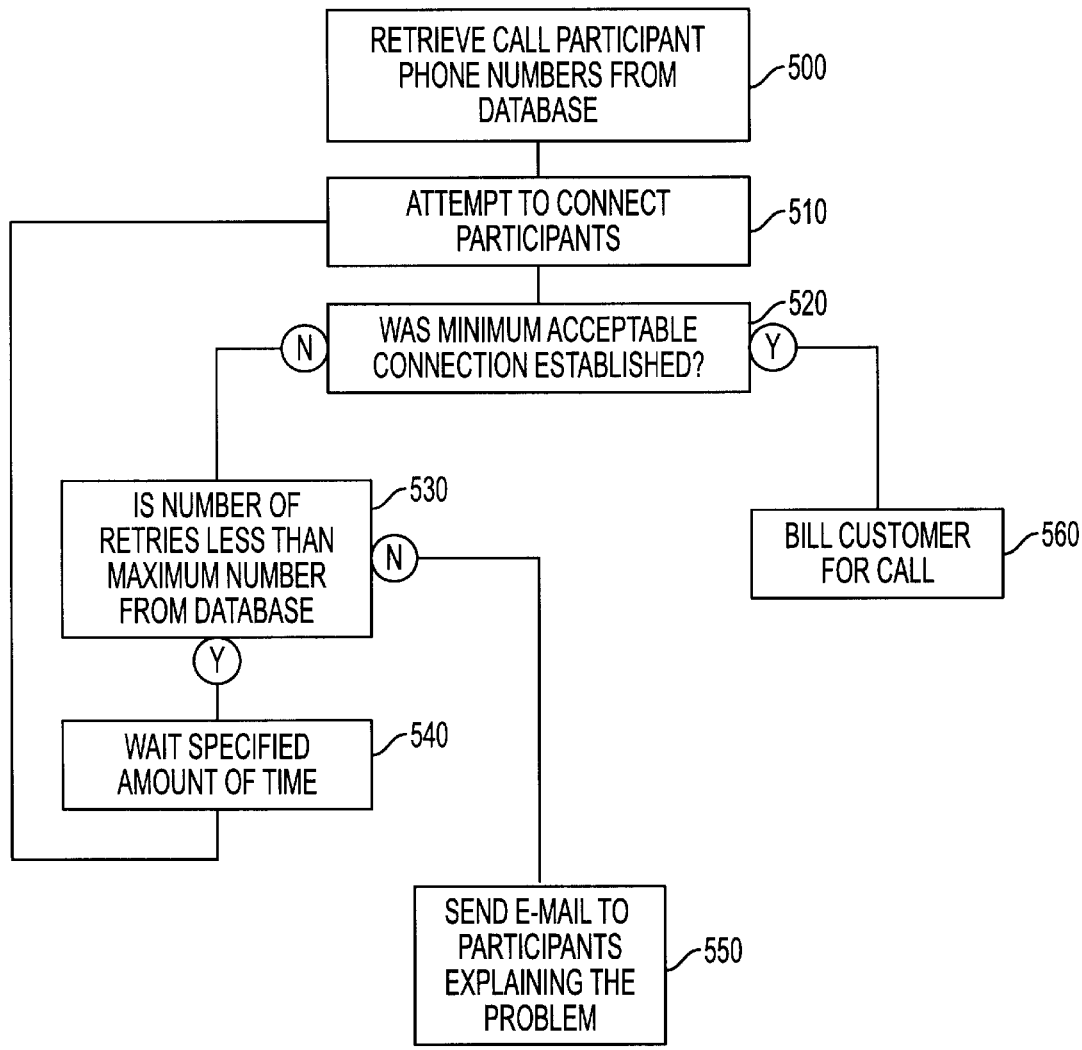
FIG. 5 is a flow chart of an exemplary callback connection process in accordance with one embodiment of the invention.

FIG. 5 is a flow chart of an exemplary callback connection process. When the time for a schedule call occurs the server will retrieve the phone numbers of participants from the database 500 and the server calls each participant and connects them (510) using methods currently used and well-known in the callback industry. The server next determines if the minimum acceptable connection has been established 520. For a two party call the minimum acceptable connection would be a connection between both parties. However, for a conference call involving a group of participants, the minimum acceptable connection could be some minimum number of participants responding to the attempt to establish the conference call. This number would need to be specified either at the time the customer registers for the service or at the time the call is pre-scheduled. The minimum acceptable connection parameters are stored in the database. If the minimum acceptable connection has not been made then the server will check to see if the maximum number of call attempts has been exceed 530. If the maximum number of attempts has not been exceeded the server will wait a pre-determined amount of time 540 and then attempt to place the call again 510. If the maximum number of attempts has been exceeded then no additional attempts will be made to place it and an E-mail message sent to the call participants 550; using for example the exemplary E-mail generation and transmission process described in FIG. 4. Once an acceptable connection has been established or once the agreed criteria for billing have been met, the customer is billed for the call 560. Billing can take many forms and includes, but is not limited to: credit card, debit card, electronic currency, and check.

In an alternative approach, the call can be pre-scheduled based on external events. The customer can establish a criteria based on some event, such as the price of stock changing by more than a given amount, the reporting of a final score in a sporting event or a news story about a particular subject, such as a company, crossing the news wire. Each of these events in the exemplary alternative can be determined from commercially available information sources. The call-back service can monitor such information services either by polling or by ongoing monitoring and trigger the establishment of a call when the event is detected.

Figure 6:
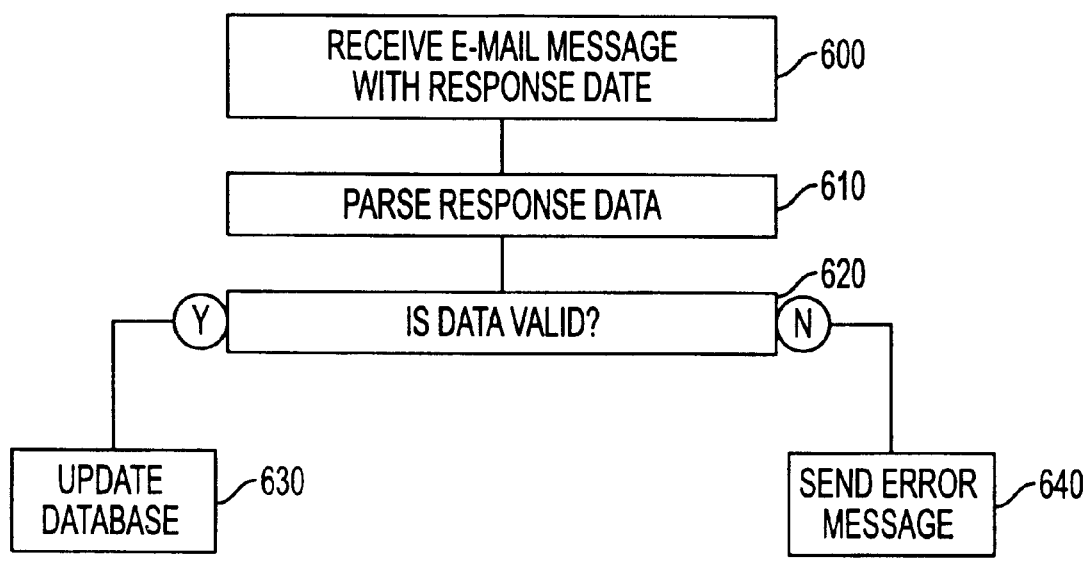
FIG. 6 is a flow chart of an exemplary E-mail response process in accordance with one embodiment of the invention.

FIG. 6 is a flow chart of an exemplary E-mail response process. When an E-mail response is received from a call participant 600 the data in the message is parsed 610. The parsing can be achieved using standard options, such as including a response type indication on the subject line of the message and options parameters in the body of the message. For example, if a participant would like to receive the pre-scheduled call at a different phone number then the statement "call forward" may be used in the subject line of the response E-mail. The body of the E-mail would contain the phone number the call should be forwarded too. Once the data is parsed from the E-mail message it is validated 620. If the data cannot be validated then a new E-mail is generated explaining the error and requesting an additional response 640. Such an E-mail can be generated as described in conjunction with FIG. 4. If the data is valid then the callback database will be updated to reflect the new information 630.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A callback service, comprising:
    a. a telephone network providing access to a plurality of users;
    b. a data network providing access to at least one of the plurality of users; and
    c. a computer having access to said telephone network and said data network and configured to store call related information with respect to at least one pre-scheduled call specified in information received over said data network, to originate a call to said at least one user over said telephone network in response to said call related information and to provide a dial tone to said at least one user in response to said at least one user answering said call.

2. The callback service of claim 1 in which said call related information includes at least one of a requesting user, a telephone number for said requesting user, a date and time for one or more pre-scheduled calls, payment information, and an e-mail address of at least one participant in a pre-scheduled call.

3. The callback service of claim 1 in which said call related information is stored in a database.

4. The callback service of claim 3 in which said call related information stored in said database is ordered chronologically based on date and time.

5. The callback service of claim 3 in which said call related information comprises entries for callbacks to be placed and entries for reminders.

6. The callback service of claim 3 in which said reminders comprise an entry for generating a reminder e-mail to call participants prior to the scheduled time of a callback.

7. The callback service of claim 6 in which said reminder e-mail is generated by merging call related information with an e-mail template.

8. The callback service of claim 6 in which said computer is configured to parse an e-mail responding to a reminder e-mail and to change call related information based on the contents of said e-mail responding to a reminder.

9. The callback service of claim 6 in which said e-mail responding to a reminder comprises a command which causes the number associated with a participant in a pre-scheduled call to change.

10. The callback service of claim 1 in which the information received over said data network is received as information from a server generated form filled out by a user.

11. The callback service of claim 1 in which the information received over said data network is received as information from an e-mail sent by a user.

12. A method of implementing a callback service, comprising the steps of:
   a. connecting a computer to a data network and to a telephone network;
   b. receiving orders for pre-scheduled callback service over said data network;
   c. causing said computer to originate a call to a user of said callback service over said telephone network at a scheduled time based on information in said orders; and
   d. providing a dial tone to said user in response to said user answering said call.

13. A method of ordering callback service, comprising the steps of:
   a. transmitting data relating to one or more pre-scheduled calls to a computer providing service to said callback service over a data network;
   b. storing said data;
   c. causing said computer to at least initiate a telephone call to a telephone subscriber over a telephone network based on said data; and
   d. providing a dial tone to said telephone subscriber in response to said telephone subscriber answering said call.

14. A method of pre-scheduling callback service, comprising the steps of:
   a. receiving pre-scheduling information from a user over a data network;
   b. initiating a telephone call to said user over a telephone network at the data and time specified in said pre-scheduling information; and
   c. providing a dial tone to said user in response to said user answering said call.

15. A computer program product, comprising:
   a. a memory medium; and
   b. a computer program, stored on said memory medium, said computer program comprising instructions for permitting a computer to engage in communications with a data network and a telephone network, for receiving orders for pre-scheduled callback service over said data network, for initiating a telephone call to said user over a telephone network at the data and time specified in one of said orders, and providing a dial tone to said user in response to said user answering said call.

16. A computer program product, comprising:
   a. a memory medium; and
   b. a computer program, stored on said memory medium, said computer program comprising instructions for transmitting data relating to one or more pre-scheduled calls to a computer providing a callback service over a data network, for storing said data and for causing said computer to at least initiate a telephone call to a telephone subscriber over a telephone network based on said data and providing a dial tone to said telephone subscriber in response to said telephone subscriber answering said call.

17. A computer program product, comprising:
   a. a memory medium; and
   b. a computer program, stored on said memory medium, said computer program comprising instructions for receiving pre-scheduling information for a callback service from a user over a data network, and initiating a telephone call to said user over a telephone network at the data and time specified in said pre-scheduling information and providing a dial tone to said user in response to said user answering said call.

* * * * *